Aug. 30, 1927.
F. J. LAHER
1,640,778
VEHICLE SPRING
Filed Oct. 2, 1924
2 Sheets-Sheet 1
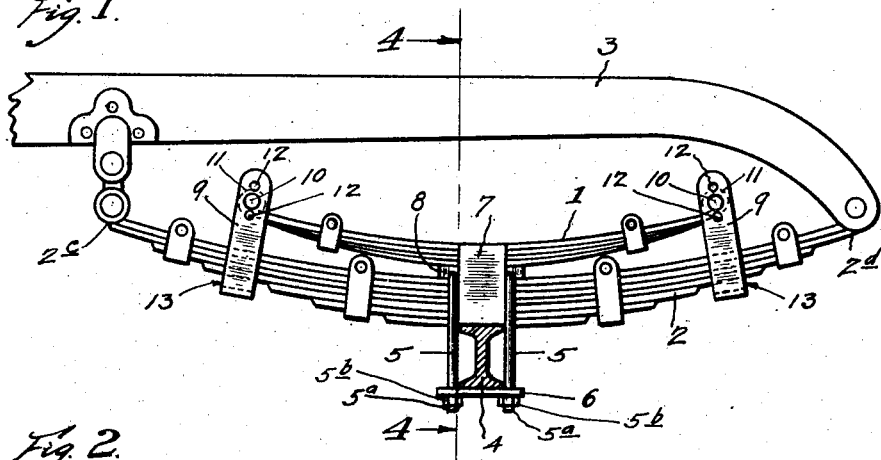
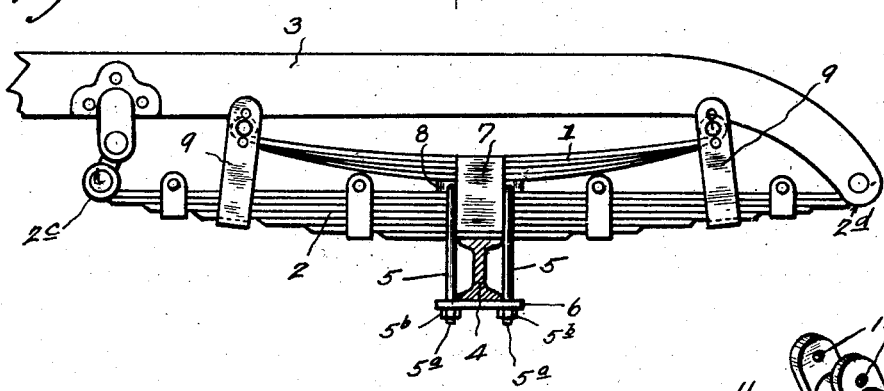
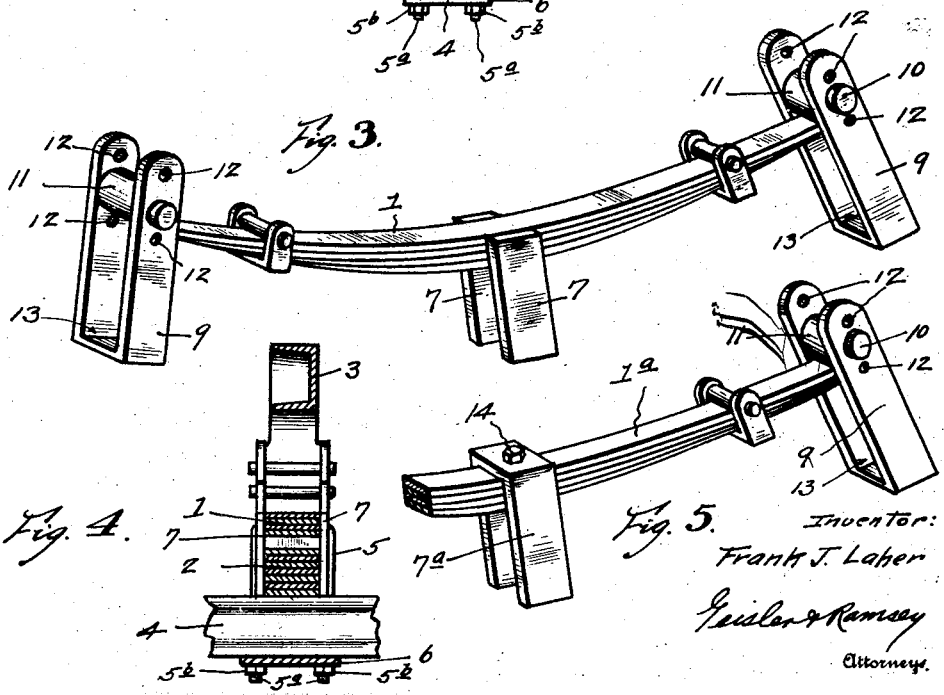
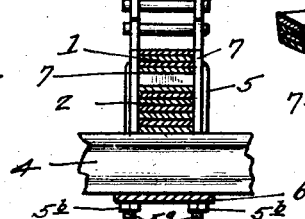
Inventor:
Frank J. Laher
Geisler & Ramsey
Attorneys.

Aug. 30, 1927.
F. J. LAHER
1,640,778
VEHICLE SPRING
Filed Oct. 2, 1924
2 Sheets-Sheet 2
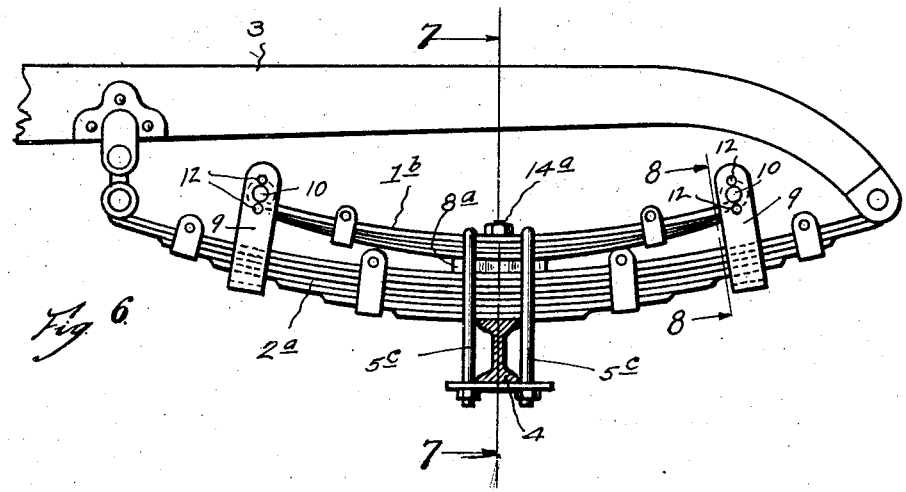
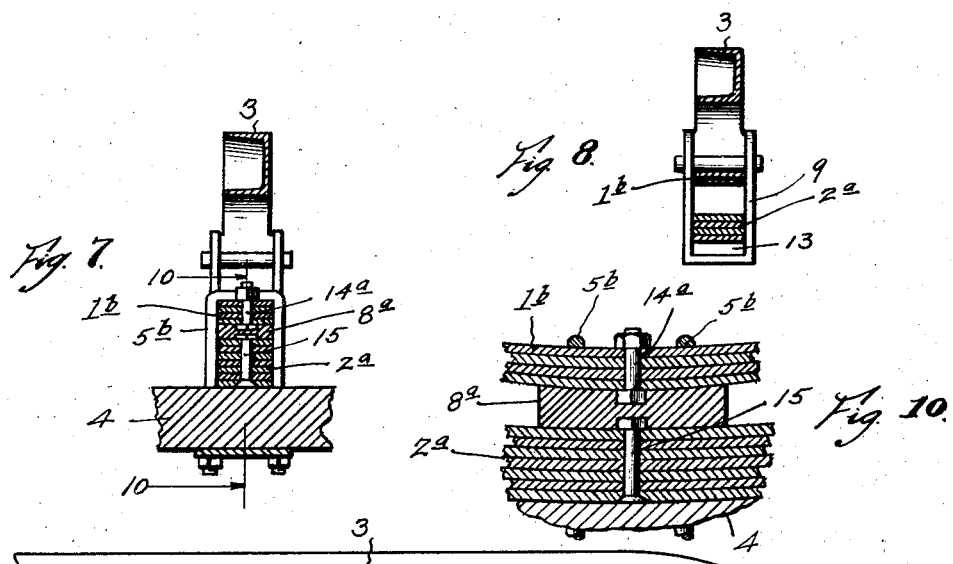
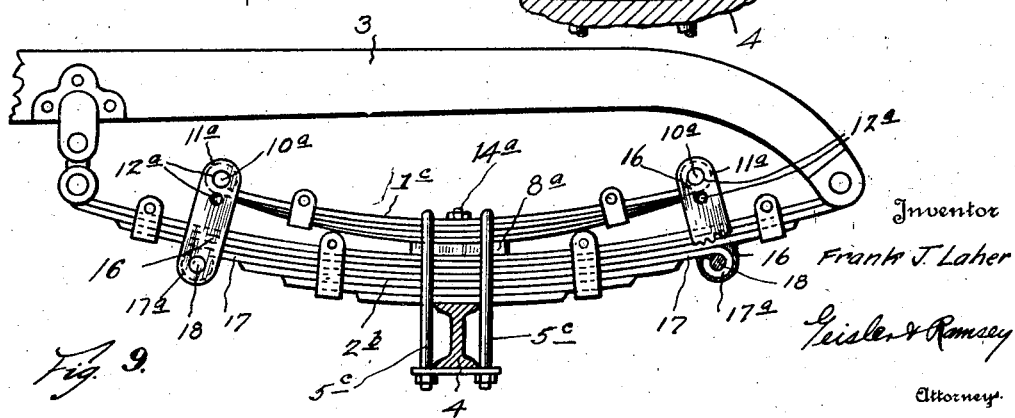
Inventor
Frank J. Laher
Geisler & Ramsey
Attorney Patented Aug. 30, 1927.

1,640,778

UNITED STATES PATENT OFFICE.

FRANK J. LAHER, OF PORTLAND, OREGON.

VEHICLE SPRING.

Application filed October 2, 1924. Serial No. 741,164.

My invention concerns an auxiliary spring for the load carrying springs of a vehicle, which may either be embodied in a readily demountable attachment to said spring, or may be connected thereto so as to constitute a connected unit therewith.

The object of my invention is to connect said auxiliary spring to said load carrying spring in such a manner that the latter will be permitted normal flexure under ordinary loads, but when said load exceeds a predetermined maximum that the further flexure will be distributed by said connections between said load carrying springs and said auxiliary spring.

In this application I have shown two modifications, embodying my invention, the first of which is the preferable type. The first example consists of a load carrying spring and an auxiliary spring fastened together at their middle, the extremities of said auxiliary spring being loosely connected with the ends of the load carrying spring by suitable devices, for example U-clips. The connection is such that the load carrying springs normally support the entire load under ordinary loads, but when the load is increased beyond a predetermined maximum, the connections distribute the load in part to the auxiliary springs.

The second embodiment consists of an auxiliary spring fastened to the load carrying spring in a similar manner, but the connection is such that the springs are connected by a member having little or no play but the restraint of the auxiliary spring upon the load carrying spring is negligible when said load carrying spring carries an ordinary load, but when said load is increased beyond a predetermined maximum the resistance of the auxiliary spring increases proportionately greater than the load carrying spring and thus carries a proportionately greater proportion of the excess load than it does of said ordinary load. In this embodiment I also show how auxiliary springs may be compressed so that they not only do not help to support the load when it is under said predetermined maximum, but also may act as a check against rebound and when the load increases beyond said maximum it may serve as an auxiliary support for said load merely by changing the tension of said spring and the proportionate rate of increase in flexure over that of said load carrying spring.

I have hereinafter disclosed both embodiments and described them in greater detail with reference to the accompanying drawings. In the drawings:

Fig. 1 is an elevation of my invention with the auxiliary spring shown as an attachment to a load carrying spring, the load carrying spring in this figure is shown as being relatively unflexed by a load;

Fig. 2 is a similar elevation with the load carrying spring straightened out and with the connecting means connecting the auxiliary spring thereto;

Fig. 3 is a slightly larger scaled perspective view of the auxiliary spring attachment;

Fig. 4 is a section taken on the line 4—4 of Fig. 1;

Fig. 5 is a fragmentary perspective view showing a slight modification in the fastening means for holding the middle portion of the auxiliary spring to the load carrying spring;

Fig. 6 is a further modification showing the two springs fastened together on a vehicle;

Fig. 7 is a section taken on the line 7—7 of Fig. 6;

Fig. 8 is a section taken on the line 8—8 of Fig. 6;

Fig. 9 is an elevation showing the second embodiment of my invention;

Fig. 10 is an enlarged fragmentary section showing a detail of construction.

In Fig. 1, the auxiliary spring 1 is removably mounted upon the load carrying spring 2. The load carrying spring is pivotally fastened by its end $2^c$ and $2^b$ to the vehicle frame 3 and at its middle to the vehicle axle 4. Two U-shaped spring clips 5 are passed over the load carrying spring 2 and its ends pass through the plate 6 which is mounted under the axle 4 and thus serves to hold the spring at its middle upon the axle 4. The ends $5^a$ of the U-clips are threaded and are provided with nuts $5^b$ for tightening the same in place. The space between the U-clips 5 is determined by the width of the flanges of the axle which is I-shaped in cross section. The U-clips usually lie very closely along said flanges and said axles are relatively standard in section in vehicles having the same capacity and thus the space between said clips is substantially uniform.

I take advantage of this arrangement, therefore, by providing my auxiliary spring with pendent side portions 7 which are welded or otherwise fastened to each side of the spring and are of substantially the same width as the spacing between said clips 5. The auxiliary spring 1 has leaves of substantially the same width as the load carrying spring 2 and thus said pendent portions 7 straddle the load carrying spring closely at each side so as to prevent lateral play and said portions fit relatively closely between said spring clips 5 to prevent longitudinal play.

I preferably space the auxiliary spring 1 and the load carrying spring 2 by a block 8 which is mounted upon the load carrying spring at its middle and upon which the auxiliary spring is mounted. Said block is preferably cut away at points at which the U-shaped clips 5 pass over the load carrying spring 2 and thus the block is held against longitudinal play by said recesses and against lateral play by the spaced pendent portion 7.

The ends of said auxiliary spring are provided with U-shaped clips 9, each of which is mounted upon a pin 10 which passes through the eye 11 at the extremities of said auxiliary spring 1. I provide a plurality of spaced holes 12 in said U-shaped clips 9 so as to vary the length of the portion depending from said pin.

When said auxiliary spring 1 is mounted in place said U-shaped clips are passed around the load carrying spring 2 and the pin 10 is passed through the holes 12 at the desired position. As shown in Figs. 1, 2, 6, and 8, there is a substantial space 13 between the inner face of the U-shaped clips and the under surface of the load carrying spring 2 and thus the U-shaped clips 9 only loosely connect said springs 1 and 2 together.

As shown in Figs. 1 and 2, the load carrying spring 2 must be flexed a predetermined degree before the clips connect the auxiliary spring thereto and thus the load carrying spring under ordinary loads is permitted its normal flexure, but when the load is increased beyond said maximum the auxiliary spring 1 is connected to said load carrying spring through said connection and thus is adapted to support a portion of said excess load. The point at which the auxiliary spring is thrown into action can be determined by the width of space 13. Thus if the pin 10 is passed through the upper holes 12 as shown in the figures the space 13 will be greater than if it is passed through the lower holes.

It is to be understood that in Figs. 1, 2, 3 and 4 the pendent portions 7 are welded to the auxiliary spring 1 and if it is desired that may also be welded to the main spring 2. If the auxiliary spring 1 is merely used as an attachment and is to be removed, of course the members would not be connected to the main spring 2 by welding.

In Fig. 5 I show how the pendent portions may be connected to the U-shaped clip and this clip 7$^a$ may be connected to the auxiliary spring 12 by a bolt 14, to hold it in place. It is to be understood that the pendent portions of this U-shaped clip are substantially equal, in size and spacing, to the pendent portions 7 in Figs. 1 to 4, inclusive.

In Fig. 6 I illustrate how the auxiliary spring 1$^b$ can be fastened to the load carrying spring 2$^a$ by the spring clips 5$^c$, of sufficient length to pass over both clips. Said springs 1$^b$ and 2$^a$ are separated by a block 8$^a$. As shown in Fig. 7 the leaves of the auxiliary spring 1$^b$ are connected by a bolt 14$^a$ and the leaves of the spring 2$^a$ connected by a bolt 15. The heads of both said bolts 14$^a$ and 15 being of substantial thickness and the block 8$^a$ has recesses therein for receiving said heads. The heads being recessed in said blocks thus prevents said block or said spring elements from shifting longitudinally relatively to each other.

The ends of the spring elements 1$^b$ and 2$^a$ in Figs. 6 to 8, inclusive, are connected together similarly as the ends of the spring elements 1 and 1$^a$ are connected to the ends of the spring element 2 in Figs. 1 to 5, inclusive; and thus are not further described in detail and bear the same reference numerals.

In Fig. 9, however, the spring elements are connected at their middles by means similar to the devices shown in Figs. 6 to 8, inclusive, but are connected at their ends by slightly different devices shown as the links 16 having holes 12$^a$ at one end and thus are relatively adjustable. The ends of the auxiliary spring 1$^c$ and the load carrying spring 2$^b$ are made with eye portions 17$^a$ at each end, through which the pin 18 passes and the spring element 1$^c$ is provided with eyes 11$^a$ through which the pin 10$^a$ passes.

In this modification I preferably use a spring element 1$^c$ which is either of slightly less strength than the spring element 2$^b$ so that under normal loads the auxiliary spring element 1$^c$ thus does not effect the flexure of the spring element 2$^b$ substantially but upon loads greater than normal the flexure of the spring element 1$^c$ will tend to resist the further flexure of the spring elements 2$^b$ by the excess load, through the connection 16. Instead of using a spring element 1$^c$ of less strength I also use a spring which normally is flexed in the opposite direction to that of load supporting position, in order to permit the pin 1$^a$ being passed through the eye 11$^a$. The auxiliary spring 1$^c$ would normally tend to curve up an arc of shorter radius than that assumed by the spring when connected, and thus the spring might act as a check against rebound under normal loads but which would be flexed to such a degree by excess loads that it would support a portion thereof and thus tend to resist further flexure of said load in proportion to the load carried thereby.

I claim:

1. In a vehicle, the combination with a load carrying spring of an auxiliary spring, a pendent member at each side of said auxiliary spring adapted to hold said auxiliary spring against shifting longitudinally upon said load carrying spring, devices connecting the auxiliary spring with the load carrying spring at each side of the middle thereof, such connections being adapted to permit the normal flexure of the load carrying spring under a load less than a predetermined maximum, and to distribute the excess load between said auxiliary spring and said load carrying spring.

2. In a vehicle, the combination with a load carrying spring fastened at its middle by two spaced clips, of an auxiliary spring, a pendent member at each side of said auxiliary spring adapted to straddle said load carrying spring and fit closely within the space between said two fastening clips, to hold said auxiliary spring against shifting longitudinally upon said load carrying spring, devices connecting the auxiliary spring with the load carrying spring at each side of the middle thereof, such connections being adapted to permit the normal flexure of the load carrying spring under a load less than a predetermined maximum, and to distribute the excess load between said auxiliary spring and said load carrying spring.

3. In a vehicle, the combination with a load carrying spring fastened at its middle by two spaced clips, of an auxiliary spring, an inverted U-clip straddling said auxiliary spring adapted to straddle said load carrying spring and fit closely within the space between said two fastening clips, to hold said auxiliary spring against shifting longitudinally upon said load carrying spring, devices connecting the auxiliary spring with the load carrying spring at each side of the middle thereof, such connections being adapted to permit the normal flexure of the load carrying spring under a load less than a predetermined maximum, and to distribute the excess load between said auxiliary spring and said load carrying spring.

4. A demountable auxiliary spring attachment for a load carrying spring of a vehicle comprising a laminated leaf spring element provided with means independent of said load carrying spring for holding the spring-leaves of said attachment together, said attachment also provided with a mounting adapted to engage the middle portion of said load carrying spring, devices adapted to be attached to the extremities of said load carrying spring, said devices adapted to permit flexure of said load carrying springs when supporting a load up to a predetermined maximum and to distribute the excess load between said auxiliary spring and said load carrying spring.

5. A demountable auxiliary spring attachment for a load carrying spring of a vehicle comprising a semi-elliptical spring element provided with spaced pendent portions one at each side thereof adapted to straddle said load carrying spring and to engage the middle portion of said load carrying spring, devices adapted to be attached to the extremities of said auxiliary spring and to engage said load carrying spring at each side of the middle thereof, said devices adapted to permit normal flexure of said load carrying springs when supporting a load up to a predetermined maximum and to distribute the excess load between said auxiliary spring and said load carrying spring.

6. A demountable auxiliary spring attachment for a load carrying spring of a vehicle comprising a spring element provided with spaced pendent portions one at each side thereof adapted to straddle said load carrying spring and to engage the middle portion of said load carrying spring, devices adapted to be attached to the extremities of said auxiliary spring and to engage said load carrying spring at each side of the middle thereof, said devices adapted to permit normal flexure of said load carrying springs when supporting a load up to a predetermined maximum and to distribute the excess load between said auxiliary spring and said load carrying spring.

7. In a vehicle, the combination with a load carrying spring, of an auxiliary laminated leaf-spring, means independent of said load carrying spring, adapted to hold said spring leaves of said auxiliary spring together, a mounting releasably engaging said auxiliary spring with said load carrying spring to prevent relative shifting of said springs and devices on the extremities of said auxiliary spring engaging said load carrying spring at each side of the middle thereof, said devices adapted to permit normal flexure of said load carrying springs when supporting a load up to a pre-determined maximum and to distribute the excess load between said auxiliary spring and said load carrying spring.

8. In a vehicle, the combination with a load carrying spring, of an auxiliary laminated leaf-spring, means independent of said load carrying spring, adapted to hold said spring leaves of said auxiliary spring together, a mounting releasably engaging said auxiliary spring with said load carrying spring to prevent relative shifting of said springs, said leaf vesting means constituting a part of said mounting and devices on the extremities of said auxiliary spring engaging said load carrying spring at each side of the middle thereof, said devices adapted to permit normal flexure of said load carrying springs when supporting a load up to a pre-determined maximum and to distribute the excess load between said auxiliary spring and said load carrying spring.

FRANK J. LAHER.